United States Patent
Sharon et al.

[11] 3,865,113
[45] Feb. 11, 1975

[54] LASER DEVICE PARTICULARLY USEFUL AS SURGICAL SCALPEL

[75] Inventors: Uzi Sharon, Tel-Aviv; Isaac Kaplan, Savyon, both of Israel

[73] Assignee: Laser Industries Ltd., Tel-Aviv, Israel

[22] Filed: Dec. 4, 1972

[21] Appl. No.: 311,776

[30] Foreign Application Priority Data
Oct. 17, 1972  Israel...................................... 40602

[52] U.S. Cl................ 128/303.1, 128/305, 128/395
[51] Int. Cl............................................ A61b 17/36
[58] Field of Search............. 128/303 R, 303.1, 395, 128/305, 396; 331/94.5

[56] References Cited
UNITED STATES PATENTS
3,467,098   9/1969   Ayres.............................. 128/395 X
3,481,340   12/1969   McKnight et al................... 128/395

*Primary Examiner*—Lawrence W. Trapp
*Attorney, Agent, or Firm*—Pennie & Edmonds

[57] ABSTRACT

A laser beam manipulator device, particularly useful as a surgical scalpel, comprises a tube connectable at one end to a movable conduit down which a laser beam propagates and a beam targeting member carried by the tube at its opposite end. The manipulator device includes a lens that focuses the laser beam to a point in a plane substantially passing through the tip of the beam targeting member at right angles to the longitudinal axis of the tube. To permit viewing of the working area at the focal point of the laser beam while the device is being manipulated, at least a portion of the tip of the beam targeting member either is removed or is made of a transparent material.

28 Claims, 13 Drawing Figures

PATENTED FEB 11 1975　　3,865,113
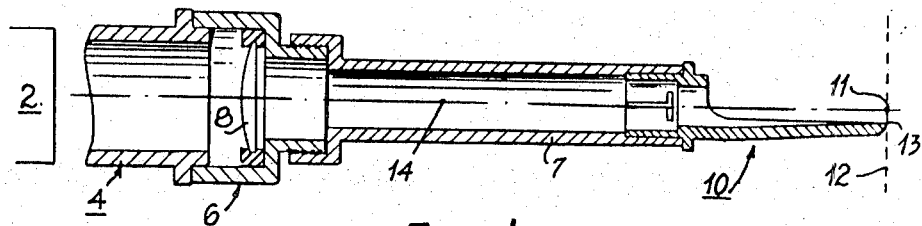
FIG. 1
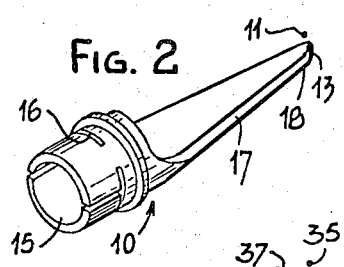
FIG. 2
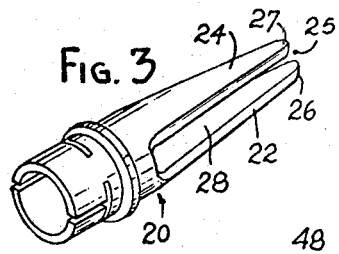
FIG. 3
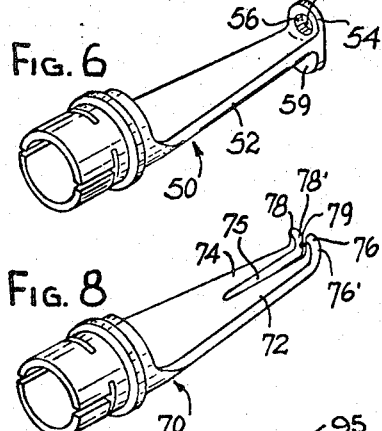
FIG. 4
FIG. 6
FIG. 8
FIG. 10
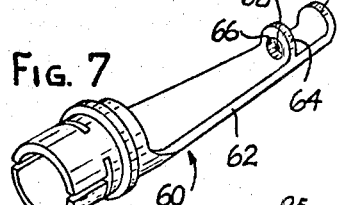
FIG. 5
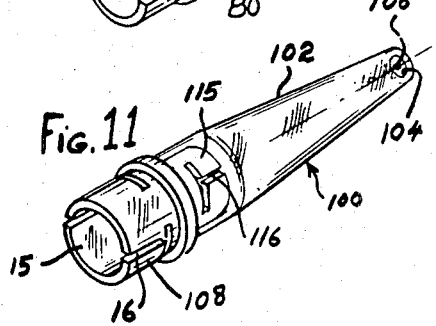
FIG. 7
FIG. 9
FIG. 11
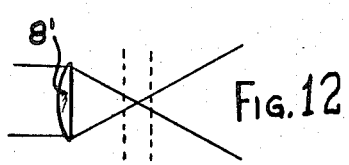
FIG. 12
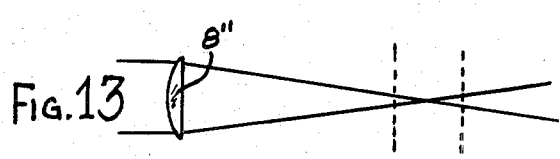
FIG. 13

LASER DEVICE PARTICULARLY USEFUL AS SURGICAL SCALPEL

BACKGROUND OF THE INVENTION

The present invention relates to laser beam devices, and particularly to laser beam manipulator devices useful as surgical scalpels.

As is well known, a laser beam can be focused to a very samll spot size such as 100 microns or less in diameter to produce a very hot concentration of light energy. At laser wavelengths such as 10.6 microns that are almost completely absorbed by body tissue, such a focused laser beam may be used to cut through most types of tissues by burning or vaporizing. One of the important advantages in using a laser beam for this purpose is that it can make very clean and fine cuts while minimizing damage to tissues outside the cutting lines. Also, the laser beam readily coagulates capillaries and small veins and arteries, thereby minimizing loss of blood and keeping the working area clean.

One problem, however, in using laser beams as surgical scalpels is the inconvenience in manipulating the laser beam and the difficulty in precisely aiming it exactly on the spot or along the line to be cut. In one known laser system shown in the article "Can Laser Beams Conquer Cancer?", Quick, No. 40, p. 40 (Munich, September 27, 1972), the laser beam is conducted from the laser through a hollow articulated conduit to a manipulator that includes a tube ending in a hollow, truncated cone, the laser beam passing through the tube and out the smaller diameter truncated end of the cone. The laser beam is focused by a lens at the projected apex of the cone far in front of the open tip of the truncated cone to permit the surgeon to view the working area as he manipulates the tube. Since it is difficult for the surgeon to continuously visualize the precise location of the projected apex of the cone and hence the focal point of the laser beam, this prior art system includes an interchangeable manipulator bearing two light sources that project two light beams which intersect at the focal point of the laser beam.

SUMMARY OF THE INVENTION

According to a broad aspect of the invention, there is provided an improved laser beam manipulator device, particularly useful as a surgical scalpel, comprising a tube connectable at one end to a manipulatable laser beam conduit and a beam targeting member carried by the tube at its opposite end. The laser beam manipulator device includes a lens that focuses a laser beam to a focal point in a plane substantially passing through the tip of the beam targeting member at right angles to the longitudinal axis of the tube, said focal point constituting the working area of the laser beam. To permit viewing said working area while the device is being manipulated, at least a portion of the tip of said beam targeting member either is removed or is made of a transparent material.

Preferably, the beam targeting member is in the form of an attachment which is attachable to or detachable from the manipulator tube.

The invention may be embodied in a number of forms, some of which are described below.

In one described embodiment, the beam targeting member includes at least one leg extending substantially parallel to the longitudinal axis of the tube and having sides converging towards said tip, said lens focusing the laser beam to a focal point slightly above the tip of said leg.

In another described embodiment, the beam targeting member includes a pair of spaced legs of equal length extending substantially parallel to the longitudinal axis of the tube, said lens focusing the laser beam to a focal point in the center of the space between said legs and substantially coplanar with the tips of said legs.

In the above-described embodiment, the pair of spaced legs may be of different lengths, in which case the lens focuses the laser beam to a focal point substantially coplanar with the tip of the longer of the two legs.

According to a further described embodiment, the beam targeting member includes a leg extending substantially parallel to the longitudinal axis of the tube and terminating at its tip in a tab extending upwardly from said leg substantially at a right angle to the leg, said tab being formed with an opening, said lens focusing the laser beam to a focal point within said opening and substantially coplanar therewith.

According to a further described embodiment, the beam targeting member further includes a protective element carried by the tip of said beam targeting member spaced forwardly thereof and in alignment with said focal point to intercept the laser beam after passing through the object located at said focal point.

According to a further described embodiment, the beam targeting member includes a pair of spaced legs curved upwardly at their tips to enable said legs also to serve as surgical retractor elements, said lens focusing the laser beam to a focal point in the space between said legs and substantially coplanar with the points on the tips of said legs which are most distant from said lens.

According to a further described embodiment, the beam targeting member is in the form of a hollow truncated cone, the smaller diameter of the truncated cone being at said tip and being cut at a bias to permit viewing said working area.

According to a still further embodiment of the invention, the beam targeting member carries a mirror spaced slightly from the focal point of the lens towards said lens, said mirror being inclined to deflect the laser beam upwardly so that its focal point is substantially coplanar with the tip of said mirror.

According to still another embodiment of the invention, the beam targeting member is a hollow transparent tube having an open end adjacent the focal point of the laser beam.

In all of the above-described embodiments, the lens used may be one having a short focal length to concentrate the energy of the laser beam within a small depth at said working area.

Alternatively, the lens used could be one having a long focal length to spread the energy of said laser beam for a significant depth at said working area.

Further features and advantages of the invention will be apparent from the description below.

BRIEF DESCRIPTION OF THE DRAWING

The invention is herein described, by way of example only, with reference to the accompanying drawings, wherein:

FIG. 1 illustrates one form of laser beam manipulator device constructed in accordance with the invention;

FIGS. 2–11 illustrate other forms of laser beam manipulator devices, particularly the beam targeting members used in such devices, constructed in accordance with the invention;

FIG. 12 diagrammatically illustrates the use of a short focal point lens in the manipulator device; and FIG. 13 illustrates the use of a long focal length lens in the manipulator device.

DETAILED DESCRIPTION OF THE DRAWING

The laser beam manipulator devices illustrated in the drawings are particularly useful as surgical scalpels. Some of these devices, however, may find application in other areas, for example precision welding. However, since the invention is particularly, although not exclusively, useful in surgical instruments, the description below will henceforth refer only to this application.

The apparatus illustrated in FIG. 1 of the drawings comprises a laser, generally designated 2, a conduit 4 for conducting the laser beam, and a manipulator 6 at the opposite end of the conduit. Manipulator 6 may be guided by the surgeon's hand for directing the beam to a working area. The conduit 4 is articulated and carries mirrors to permit movement of the manipulator 6 and to conduct the laser beam to any location assumed by the manipulator. A lens 8 disposed within the manipulator focuses the laser beam to a focal point.

As described earlier, one of the serious problems in using this instrument as a surgical scalpel is the difficulty in precisely spotting the focused laser beam on the working spot or along the working line of cut.

According to the present invention, the manipulator comprises a tube 7 and a beam targeting member, generally designated 10 in FIG. 1. Lens 8 disposed within the manipulator focuses the laser beam to a focal point 11 in a plane 12 substantially passing through the tip 13 of the beam targeting member and at right angles to the longitudinal axis 14 of the manipulator. Focal point 11 constitutes the working area. To permit viewing this working area while handling the manipulator, at least a portion of the tip of the beam targeting member either is removed or is made of a transparent material.

FIG. 2 better illustrates the beam targeting member 10 of FIG. 1. It will be seen that one end 15 of the member is tubular in shape and is formed with slots 16 to permit quick attachment to manipulator tube 7 by a press-fit, and quick detachment therefrom. The other end of targeting member 10 is formed with a leg 17, the sides of which converge towards tip 10. Leg 17 extends substantially parallel to (but may be inclined slightly towards) the longitudinal axis of manipulator tube 7. Lens 8 in the manipulator tube focuses the laser beam to point 11 which is precisely at the end and slightly above tip 13.

By the use of this beam targeting member, the surgeon can precisely position the laser beam at the exact working spot and has a clear unobstructed view of this working spot. To facilitate moving this member across the object (e.g. biological tissues) receiving the laser beam, the lower face 18 of tip 13 is preferably rounded.

FIG. 3 illustrates another form of beam targeting attachment which may be used. In this attachment, generally designated 20, there are a pair of spaced legs 22, 24 of equal length and substantially parallel to the longitudinal axis of manipulator 6. Lens 8 in the manipulator focuses the laser beam to a focal point 25 which is substantially coplanar with the tips 26, 27 of the two legs 22, 24, and in the center of the space 28 between the two legs. In using such a construction, the manipulator would be held so that the two legs 22, 24 are in a substantially horizontal side-by-side relationship, whereby the space 28 between the two legs would provide the surgeon with an unobstructed view of the working area, namely focal point 25.

FIG. 4 illustrates a modification to the form of the device of FIG. 3. In this modified form, generally designated 30, the two legs 32, 34 are of unequal length, in which case the laser beam is brought to a focal point 35 substantially coplanar with the tip 36 of the longer leg 32. This construction permits the device to be used with the two legs in a substantially vertical position (as for example when probing), while still permitting a good view of the working area by the fact that the tip 37 of leg 34 (which would be in the upper position during this use) is smaller than tip 36 and therefore does not obscure the focal point 35 coplanar with tip 36.

FIG. 5 illustrates a still further form of beam targeting member useful with the manipulator. In this form, generally designated 40, leg 42 terminates at its tip in a tab 44 extending upwardly from the leg and substantially at a right angle thereto. Tab 44 is formed with a central opening 46, the center 48 of the opening constituting the focal point for the laser beam as focused by lens 8 in the manipulator tube.

FIG. 6 illustrates another form similar to that of FIG. 5, but modified. The beam targeting member in FIG. 6, generally designated 50, includes the same elements as that in FIG. 5, namely leg 52, upwardly extending tab 54 having an opening 56 therein, the center 58 of which constitutes the focal point for the laser beam. In addition, the form of FIG. 6 includes a second tab 59 carried at the tip of leg 50 and extending downward from the leg at a right angle thereto. This second tab 59 may serve as a surgical retractor element during use of the manipulator by the surgeon.

FIG. 7 illustrates a further modification similar to that of FIG. 5. This modification, generally designated 60, also includes a leg 62, an upwardly extending tab 64 having an opening 66 therein, the center 68 of which is the focal point of the laser beam. In addition, leg 62 is extended and is provided with a second upwardly extending tab 69 aligned with opening 66 of tab 64. The second tab 69 is used as a protective element to block the further propagation of the laser beam after it has passed through focal point 68. In other words, when using the device of FIG. 7, the object (e.g. an artery) to be subjected to the laser beam is located between tabs 64 and 69, with the area to be cut exactly centered by opening 66. Tab 69 serves to clock the propagation of the laser beam after it has passed through the surface to be cut, so as to protect other tissues or organs on the other side of tab 69.

FIG. 8 illustrates a still further beam targeting member attachable to manipulator tube 7. The FIG. 8 form, generally designated 70, includes a pair of spaced legs 72, 74 which curve upwardly at their tips 76, 78 to enable the legs also to serve as surgical retractor elements. The focal point for the laser beam is shown at 79, which is in the space 75 between the two legs, and substantially coplanar with the points 76', 78' on the tips of the two legs which are most distant from focusing lens 8.

FIG. 9 illustrates a still further embodiment. In this embodiment, generally designated 80, the beam targeting member is in the form of a hollow truncated cone 81, the smaller diameter end of which is cut at a bias as shown at 82. The extreme tip of the truncated cone is shown at 84, and the focal point of the laser beam is at 85, substantially coplanar with tip 84. Since 84 is cut at a bias, the upper surface of cut 82 is sufficiently removed from the focal point 85 so as not to obscure the working area at this focal point during use by the surgeon.

FIG. 10 illustrates a further embodiment, generally designated 90, wherein the leg 92 of the attachment carries a mirror 94 just before the focal point of the lens (lens 8 in FIG. 1), i.e., on the lens side of the focal point. Preferably, the mirror is at a 45° angle to deflect the beam to a focal point 95 just above the mirror and substantially coplanar with its tip. Other mirror angles, however, may be used.

FIG. 11 illustrates still another embodiment, generally designated 100, in which the beam targeting member is a hollow transparent tube 102 with an opening 104 adjacent the focal point 106 of a beam from lens 8. Opening 104 is formed so that the edge of the opening most distant from focusing lens 8 is substantially coplanar with focal point 106. Tube 102 is mounted on a coupling 108 having two similar terminations. One end 15 is the same as that of the other embodiments. The other 115 is likewise equipped with slots 116 to permit quick attachment of tube 102 to coupling 108 by a press-fit, and quick detachment therefrom. Advantageously, embodiment 100 is formed simply by mounting on coupling 108 a conventional transparent Pyrex test tube, or centrifuge tube, of such a length that the bottom of the tube coincides with the focal point of the laser beam focused by lens 8. The laser beam is then directed through lens 8 to melt the bottom of the transparent tube, thereby forming an opening whose edges are substantially coplanar with the focal point of the beam from lens 8.

The foregoing embodiments, as well as others that will undoubtedly occur to one skilled in the art in accordance to the foregoing description of the invention, could be provided as a set of attachments to the laser beam manipulator to be selectively used by the surgeon in accordance with the particular conditions of the surgery to be performed. Of the numerous embodiments described, that of FIG. 11 is at present preferred because of its general versatility and the facility with which it can be made.

In many cases, the surgeon will wish to make a fine cut of the tissue located exactly at the focal point of the beam targeting member without cutting to any significant depth below the spot or line to receive the laser beam. In such a case, lens 8 in manipulator tube 7 would be of a short focal length, as shown by lens 8' in FIG. 12, whereupon the energy of the laser beam would be concentrated within a small depth at the working area. However, in other cases it may be desired to have the laser beam penetrate to a significant depth at the working area, and in that case a long focal-length lens 8'' would be used as shown in FIG. 13, to spread the energy of the laser beam in the required depth of the working area.

As indicated above, the invention may be used in other applications such as fine precision welding and material cutting. Many other variations, modifications, and applications will be apparent. In particular, it should be noted that features of different embodiments may be combined. For example, the bias cut illustrated in FIG. 9 may also be used in the embodiment of FIG. 11 and all or part of the beam targeting members of the embodiments of FIGS. 2–10 may be made of a transparent material like that of the embodiment of FIG. 11. Similarly, only portions of tube 102 of FIG. 11 need be transparent. However, in all these embodiments and in variations thereon, it is necessary that enough of the beam targeting member either be removed or be transparent so that a surgeon handling manipulator 6 is able to see the working area at the focal point of the laser beam. Likewise, it should be noted that manipulator tube 7 and/or lens 8 may be made as part of conduit 4.

What is claimed is:

1. A laser beam manipulator device that indicates the point of focus of a focused laser beam comprising:
   a tube connectable at one end to a manipulatable laser beam conduit through which the laser beam passes;
   a beam targeting member carried by the tube at its opposite end;
   said beam targeting member having a tip that is approximately the same distance along the longitudinal axis of the tube as the focal point of the laser beam; and
   means for permitting the viewing of the area around the focal point while the laser beam manipulator device is being maneuvered by an operator.

2. A device according to claim 1 wherein said beam targeting member is in the form of an attachment attachable to and detachable from said tube.

3. A device according to claim 1 wherein said beam targeting member includes at least one leg extending substantially parallel to the longitudinal axis of the tube, the laser beam being focused to a focal point slightly above the tip of said leg.

4. A device according to claim 3 wherein the lower face of the tip of said leg is rounded to facilitate its movement across the object to receive the laser beam.

5. A device according to claim 1 wherein said beam targeting member includes a pair of spaced legs of equal length extending substantially parallel to the longitudinal axis of the tube, the laser beam being focused to a focal point in the center of the space between said legs and substantially coplanar with the tips of said legs.

6. A device according to claim 1 wherein said beam targeting member includes a pair of spaced legs of different lengths extending substantially parallel to the longitudinal axis of the tube, the laser beam being focused to a focal point in the center of the space between said legs and substantially coplanar with the tip of the longer of said legs.

7. A device according to claim 1 wherein said beam targeting member includes a leg extending substantially parallel to the longitudinal axis of the tube and terminating at its tip in a tab extending from said leg at an angle thereto, said tab being formed with an opening, the laser beam being focused to a focal point within said opening.

8. A device according to claim 7 wherein said leg further carries at its tip a second tab extending from said leg at an angle thereto, said second tab serving as a surgical retractor element.

9. A device according to claim 1 further including a protective element carried by the tip of said beam targeting member spaced forwardly thereof and in alignment with the laser beam to block the laser beam after it passes through an object located at the focal point.

10. A device according to claim 1 wherein said beam targeting member includes a pair of spaced legs curved upwardly at their tips to enable said legs also to serve as surgical retractor elements, the laser beam being focused to a focal point in the space between said legs and substantially coplanar with the points of the tips of said legs which are most distant from said lens.

11. A device according to claim 1 wherein said beam targeting member is in the form of a hollow truncated cone, the smaller diameter of the truncated cone being at said tip and being cut at a bias to permit viewing said working area.

12. A device according to claim 1 wherein said beam targeting member carries a mirror spaced slightly from the focal point of the lens towards said lens, said mirror being inclined to deflect the laser beam so that its focal point is substantially coplanar with the tip of said mirror.

13. A device according to claim 1 wherein said beam targeting member is a hollow transparent tube with an opening adjacent the focal point of the laser beam.

14. A device according to claim 1 further comprising a lens having a short focal length to concentrate the energy of the laser beam within a small depth adjacent the focal point.

15. A device according to claim 1 further comprising a lens having a long focal length to spread the energy of the laser beam for a significant depth adjacent the focal point.

16. A laser beam manipulator device that indicates the point of focus of a focused laser beam comprising:
a beam targeting member connectable at one end to a manipulatable laser beam conduit through which the laser beam passes;
said beam targeting member having a tip that is approximately the same distance from the conduit as the focal point of the laser beam; and
means for permitting the viewing of the area around the focal point while the laser beam manipulator device is being maneuvered by an operator.

17. A device according to claim 16 wherein said beam targeting member includes at least one leg extending substantially parallel to the longitudinal axis of the tube, the laser beam being focused to a focal point slightly above the tip of said leg.

18. A device according to claim 16 wherein said beam targeting member includes a pair of spaced legs of equal length extending substantially parallel to the longitudinal axis of the tube, the laser beam being focused to a focal point in the center of the space between said legs and substantially coplanar with the tips of said legs.

19. A device according to claim 16 wherein said beam targeting member includes a pair of spaced legs of different lengths extending substantially parallel to the longitudinal axis of the tube, the laser beam being focused to a focal point in the center of the space between said legs and substantially coplanar with the tip of the longer of said legs.

20. A device according to claim 16 wherein said beam targeting member includes a leg extending substantially parallel to the longitudinal axis of the tube and terminating at its tip in a tab extending from said leg at an angle thereto, said tab being formed with an opening, the laser beam being focused to a focal point within said opening.

21. A device according to claim 20 wherein said leg further carries at its tip a second tab extending from said leg at an angle thereto, said second tab serving as a surgical retractor element.

22. A device according to claim 16 further including a protective element carried by the tip of said beam targeting member spaced forwardly thereof and in alignment with the laser beam to block the laser beam after it passes through an object located at the focal point.

23. A device according to claim 16 wherein said beam targeting member includes a pair of spaced legs curved upwardly at their tips to enable said legs also to serve as surgical retractor elements, the laser beam being focused to a focal point in the space between said legs and substantially coplanar with the points of the tips of said legs which are most distant from said lens.

24. A device according to claim 16 wherein said beam targeting member is in the form of a hollow truncated cone, the smaller diameter of the truncated cone being at said tip and being cut at a bias to permit viewing said working area.

25. A device according to claim 16 wherein said beam targeting member carries a mirror spaced slightly from the focal point of the lens towards said lens, said mirror being inclined to deflect the laser beam so that its focal point is substantially coplanar with the tip of said mirror.

26. A device according to claim 16 wherein said beam targeting member is a hollow transparent tube with an opening adjacent the focal point of the laser beam.

27. In combination:
a manipulatable laser beam conduit through which a laser beam passes;
means for focusing said laser beam at a point beyond an end of said conduit;
a beam targeting member carried by said conduit at said end;
said beam targeting member having a tip that is approximately the same distance from the conduit as the focal point of the laser beam; and
means for permitting the viewing of the area around the focal point while the beam targeting member is being maneuvered by an operator.

28. A surgical device that indicates the point of focus of a focused laser beam comprising:
a tube through which the laser beam passes, said tube being connectable at one end to a manipulatable laser beam conduit;
a beam targeting member carried by the tube at its opposite end;
said beam targeting member having a tip that is approximately the same distance from the tube as the focal point of the laser beam; and
means for permitting a surgeon to view the area around the focal point while he operates with said device.

* * * * *